United States Patent

Hatanaka et al.

Patent Number: 5,541,008
Date of Patent: Jul. 30, 1996

[54] MAGNETIC RECORDING MEDIUM

[75] Inventors: Hideo Hatanaka, Neyagawa; Masaru Higashionji, Katano; Hideaki Mukae, Sanda, all of Japan

[73] Assignee: Matsushita Electric Industrial Co., Ltd, Kadoma, Japan

[21] Appl. No.: 345,353

[22] Filed: Nov. 18, 1994

Related U.S. Application Data

[63] Continuation of Ser. No. 651,546, Feb. 6, 1991, abandoned.

[30] Foreign Application Priority Data

Feb. 13, 1990 [JP] Japan ........................... 2-32067
Jun. 11, 1990 [JP] Japan ........................... 2-153197

[51] Int. Cl.⁶ ..................................................... G11B 5/66
[52] U.S. Cl. .............. 428/634 B; 428/363; 428/357; 428/401; 428/402; 428/694 BS; 428/694 BB; 428/694 BN; 428/900
[58] Field of Search ............................ 428/363, 357, 428/402, 401, 694 B, 694 BS, 694 BB, 694 BN, 900

[56] References Cited

U.S. PATENT DOCUMENTS

| | | | |
|---|---|---|---|
| 4,568,619 | 2/1986 | Hiller | 428/694 |
| 4,746,558 | 5/1988 | Shimozawa et al. | 428/694 |
| 4,963,433 | 10/1990 | Ogawa et al. | 428/694 |
| 5,019,446 | 5/1991 | Bunnell | 428/324 |

FOREIGN PATENT DOCUMENTS

| | | |
|---|---|---|
| 60-143433 | 7/1985 | Japan . |
| 60-205821 | 10/1985 | Japan . |
| 63-29318 | 2/1988 | Japan . |

OTHER PUBLICATIONS

Patent abstracts of Japan, unexamined applications, P field, vol. 7, No. 290, Dec. 24, 1983.
Patent abstracts of Japan, unexamined applications, P field, vol. 13, No. 159, Apr. 18, 1989.
Speliotis, "Temperature Effects in Barium Ferrite Particles", IEEE Transactions on Magnetics, vol., MAG–22, No. 5, Sep., 1986.

*Primary Examiner*—Leszek Kiliman
*Attorney, Agent, or Firm*—Cushman, Darby & Cushman

[57] ABSTRACT

In the magnetic recording medium, the non-magnetic substrate has at least one under-coat layer including the flake powder of non-magnetic material on its surface, thereby splendid property of running durability and electromagnetic transducing characteristics is achieved in spite of thinning the total thickness of the magnetic recording medium.

9 Claims, 6 Drawing Sheets

MAGNETIC RECORDING MEDIUM

This is a continuation of application Ser. No. 7/651,546, filed on Feb. 6, 1991, which was abandoned upon the filing hereof.

FIELD OF THE INVENTION AND RELATED ART STATEMENT

1. Field of the Invention

The present invention relates to magnetic recording medium (e.g. magnetic tape, video tape, flexible disk), which has, on a non-magnetic substrate, a magnetic layer on one surface thereof and a back-coat film on the other surface thereof.

2. Description of the Related Art

The magnetic recording medium is usually used as a medium on which a magnetic signal is recorded, and the medium in the form of a tape, disk, card, etc. are used depending on ways of use.

In recent years, high density magnetic recording is required in the magnetic recording. And recent development results in a short wave length of magnetic recording signal, and especially in a tape shaped magnetic recording medium it results In an extraordinarily small total thickness of the tape in order to enlarge recording capacity.

Concerning the short wave length of magnetic recording signal, the smoothing of surface of the magnetic film is required in all types of medium such as a coated magnetic recording medium (which consists of a magnetic film including powdered ferromagnetic material and binder thereof on a non-magnetic substrate) and a metal thin film type magnetic recording medium (which consists of a magnetic metal film formed by a method of (e.g. a vapor deposition, a sputtering, an ion plating or a plating). Accompanied by highly smoothing of the surface of the magnetic film, a coefficient of friction of the surface of the magnetic film shows a rising tendency. And such increased friction deteriorates stable runability and/or running durability of the tape.

Furthermore, the above-mentioned decrease of total thickness of tape shaped magnetic recording medium also remarkably deteriorates the stable runability and/or running durability of the tape. And characteristics for recording electric signals in magnetization and for converting such magnetization back into electric signals (hereinafter both are referred to as electromagnetic transducing characteristics) are also deteriorated by the decrease of total thickness of the magnetic recording tape. These deteriorations are caused by a considerable reduction of the stiffness of the tape, which results from the decrease of total thickness of the magnetic recording tape. The reason why the stiffness of the tape has an effect on the electromagnetic traducing characteristic is elucidated hereinafter, by taking an example of a VTR tape.

A VTR tape runs being wound on and around several tape guide posts at a predetermined angle. Some tape guide posts are disposed to control upper side edge position of the running VTR tape and others are disposed to control lower side edge position of the running VTR tape. In case the running VTR tape is about to be off a tape guide post, a stiffness (which is reaction force against an external force which is about to change the shape of the VTR tape) of the VTR tape itself acts as a keeping force for keeping the VTR tape on the guide post.

Further, the stiffness of the VTR tape creates a controlling force for controlling "characteristic of a contact" of a magnetic head (for recording/reproducing) with the VTR tape having a constant tension at running. The "characteristic of the contact" is defined by a gap between the surface of the VTR tape and the surface of the magnetic head and stability of the gap. Thus, in case the stiffness of the tape is reduced owing to the total thickness of the tape, the above-mentioned keeping force and controlling force decrease. Resultantly, the following problems occur such that: a fold of the VTR tape is made in running, and/or the side edge of the VTR tape is stretched into undulant shape. In addition to these problems, deterioration of the electromagnetic transducing characteristics (especially the characteristic for converting from magnetizations to electric signals) or unstableness thereof is likely to occur.

There was already proposed that a smooth surface of the magnetic film has been achieved as a way for improvement of a stable runability (characteristic) and running durability by forming a back-coat film which consists of a dispersed powder in inorganic material binder on a non magnetic substrate. Though considerable improvement is made by the proposed way, it is not enough.

In case of the magnetic recording medium having an extraordinally small total thickness (e.g. a VHS type VTR tape having the thickness of less than 16 μm or an 8 mm VTR type tape having the thickness of less than 11 μm), in order to improve the stiffness of the magnetic recording medium having the small thickness, investigation has been made to increase the stiffness of the non-magnetic substrate, the magnetic film and/or the back-coat film.

There has been investigation as a way for improvement of the stiffness of the non-magnetic substrate, such new materials as aromatic polyamide or aromatic polyimide having good characteristic such as large stiffness and high heat-resisting property is used as a non-magnetic substrate, instead of typical conventional material such as polyester materials e.g. polyethylene terephthalate (hereinafter it is abbreviated to PET) and polyethylene naphthalate (hereinafter it is abbreviated to PEN), which materials of PET and the PEN have been known as non-magnetic substrate of tape or disk-shaped magnetic recording medium. But, the above-mentioned new materials, though which has good characteristics, are much expensive than the conventional one i.e. PET or PEN, and further more, these materials have some defects e.g. poor adhesive property (adhesiveness) to the magnetic film and the back-coat film and large hygroscopicity. Thus, these materials having good characteristics are not good enough for improvement of the stiffness.

It has been proposed as a way for improvement of the stiffness of the non-magnetic substrate to form a metal thin film on the non-magnetic substrate by an adhesion or a vapor deposition. Examples of the way for such improvement are shown, for instance in the gazette of the Japanese unexamined patent applications (Tokkai) Sho 60-143433, Sho 60-205821 and Sho 63-29318. But the magnetic recording medium obtained by the above-mentioned way shows some problems (e.g. cutting is difficult due to nature of the metal thin film and poor adhesive property of the metal thin film to the magnetic film and the back-coat film).

It has been investigated as a way for improvement of the stiffness of the magnetic film and/or the back-coat film, that a resin having a high glass-transition temperature is used as a binder in the magnetic film and/or the back-coat film, or that a fibrous reinforcing filler is mixed in the binder of these films. But, because of using the resin having a high glass-transition temperature, remarkable improvement of the stiffness can not be obtained. And further, it becomes hard to smooth the surface of the magnetic film or the back-coat film owing to hardening of the resin itself, and it is difficult to keep good dispersion of the powdered magnetic material and/or the inorganic material, as well as sufficient reactivity to a cross linking agent and high wear resistance respectively. The way of mixing the fibrous reinforcing filler in the binder gives only insufficient stiffness and smoothness of these films (magnetic film and the back-coat film), since it is difficult to have good dispersion and orientation of the filler. Thus, both the conventional proposed ways show numerous problems.

It has been difficult to provide a comparatively inexpensive magnetic recording medium enabling (stable runability and) sufficient running durability without deterioration of the electromagnetic transducing characteristics under recent requirements, wherein the very thin magnetic recording medium having highly smoothened magnetic film is required in order to realize high density magnetic recording and large recording capacity.

OBJECT AND SUMMARY OF THE INVENTION

The present invention is intended to solve the above-mentioned problems shown in the related arts. The purpose of the present invention is to provide a magnetic recording medium having improved running (characteristic) and running durability, even under requirements of thinning the total thickness of the magnetic recording medium and smoothing the magnetic film, realizing high density magnetic recording and large recording capacity.

These objects are accomplished by a magnetic recording medium comprising:

a non-magnetic substrate having at least one under-coat film including flake powder of non-magnetic inorganic material and binder and formed at least on one surface thereof;

a magnetic film formed on either one face of the non-magnetic substrate; and a back-coat film formed on a side, which is opposite to the magnetic film, of said non-magnetic substrate.

In the magnetic recording medium of the present invention, the stiffness thereof is remarkably improved without deterioration of electromagnetic traducing characteristics.

The under-coat film in the magnetic recording medium has little anisotropy of the elastic modulus in the plane thereof, and the under-coat film has high elastic modulus, because the flake powder of non-magnetic inorganic material is mixed with a binder to form the under-coat film and the flake powder is aligned in the plane of the under-coat film. Since the under-coat film having high stiffness is provided at least between the non-magnetic substrate and the magnetic film or between the non-magnetic substrate and the back-coat film, the stiffness of the whole magnetic recording medium is raised. Thus, it is realized to provide the relatively inexpensive magnetic recording medium which has splendid property of stable runability, high durability, and splendid electromagnetic transducing characteristics even under a small total thickness.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

The present invention is elucidated in detail with reference to the accompanying drawings and the following examples of video tapes. In these elucidation, parts of components are all by weight.

Preparation of a coating material (M) to make a magnetic film used in all examples and comparison examples is explained below:

[The Coating Material (M)]

(a) Milling and dispersion of the following materials are made in a press kneader and further in a sand mill to make a composition;

| | |
|---|---|
| $\gamma\text{-Fe}_2O_3$ containing Co<br>BET specific surface area = 50 m$^2$/g<br>Hc = 900 Oe<br>σS = 78 emu/g | 100 parts |
| Polyurethane resin | 10 parts |
| Vinyl chloride copolymer resin | 10 parts |
| $\alpha\text{-Al}_2O_3$<br>(average particle size = 0.3 μm) | 7 parts |
| Carbon black (average particle size = 50 mμ) | 1 parts |
| Myristic acid | 2 parts |
| Butyl stearate | 1 part |
| Organic solvent mixture<br>(MEK*:toluene:cyclohexanone = 3:2:1) | 250 parts |

(*:Methyl ethyl ketone hereafter it is abbreviated to MEK)

(b) Admixing of 5 parts of a polyisocyanate compound (registered trademark "Coronate-L", which is supplied by Nippon Polyurethane Industry Co., Ltd.) with the composition, is made to make an admixture and;

(c) Filtrating the admixture through a filter of 1-μm mean pore size to make up the intended coating material (M) or the magnetic film use.

Preparation of a coating material herein referred to as (B) to make a back-coat film used in all examples and comparison examples is explained below:

[The Coating Material (B)]

(a) Milling and dispersion of the following materials is made in a ball-mill to make a composition;

| | |
|---|---|
| Carbon black (average primary-particle size = 20 mμ) | 100 parts |
| α-Al$_2$O$_3$ (average particle size = 0.30 μm) | 3 parts |
| Polyurethane resin | 45 parts |
| Nitrocellulose resin | 45 parts |
| Organic solvent mixture (MEK:toluene:cyclohexanone = 2:2:1) | 600 parts |

(b) Addition of 10 parts of a polyisocyanate compound ("Coronate-L"), to the composition is made;

(c) The composition is stirred with a high-speed agitator to make a resulting blend and;

(d) The resulting blend is filtered through a filter of 2-μm mean pore size to make up the intended coating material (B) for the back-coat film use.

[Example 1]

At first, a coating material herein referred to as (A-1) for an under-coat film used in Example 1, 2 and 3 is explained.

(3-1) The coating material (A-1) for the undercoat film is prepared as follows:

(a) Milling and dispersion of the following materials is made in a press kneader and further in a sand mill to make a composition;

| | |
|---|---|
| Flake powder of α-Fe$_2$O$_3$ (which corresponds flake powder of non-magnetic inorganic material) Aspect ratio[*1] R = 60 Average diameter = 0.6 μm | 100 parts |
| Polyurethane resin[*2] | 18 parts |
| Vinyl chloride copolymer resin[*2] | 18 parts |
| Organic solvent mixture (MEK:toluene:cyclohexanone = 3:2:1) | 200 parts |

(b) Admixing of 9 parts of a polyisocyanate compound[*2] ("Coronate-L") with the composition is made to make an admixture and;

(c) Filtrating the admixture through a filter of 2-μm mean pore size to make up the intended coating material (A-1) for the under-coat film use.

(*1: The aspect ratio R is defined as a ratio of an average diameter of the particle of the flake powder to an average thickness thereof (i.e. an average diameter/an average thickness. An average diameter is the averaged value of the maximum diameter and the minimum diameter in the plane of particles of the flake powder.)) (*2: These substances correspond with the binder.)

Figure 1:
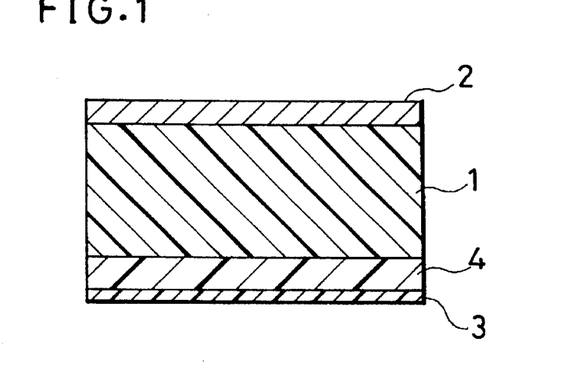
FIG. 1 is a cross-sectional view of a video tape of the Example 1 of the present invention.

FIG. 1 is a cross-sectional view of a video tape of this Example 1 of the present invention. In FIG. 1, numerals 1, 2, 3 and 4 designate a non-magnetic substrate, a magnetic film, a back-coat film and an under-coat film, respectively.

(3-2) Next, video-tape samples of example 1 were made by the following procedure;

(a) The coating material (M) for the magnetic film was applied on a 6-μm thick PET film of the non-magnetic substrate 1, and the applied coating material (M) was subjected to a known magnetic field orientation treatment and then dried;

(b) The dried coating material (M) was mirror-finished by means of a calendar and then heat-treated to give a stock roll of PET film having a 2.5-μm thick magnetic film 2 on one side;

(c) The coating material (A-1) for an under-coat film was then applied on the side opposite to the magnetic film, of the PET film 1, and dried;

(d) The dried coating (A-1) was mirror-finished by means of a calendar and then heat-treated to form a 3-μm thick under-coat film 4;

(e) The coating material (B) for the back-coat film was applied on the under-coat film 4, dried, and heat-treated to form a 0.5-μm thick back-coat film 3, and (f) The coated film was split to give ½ inch video tape of samples (250 m long).

[Example 2]

Figure 2:
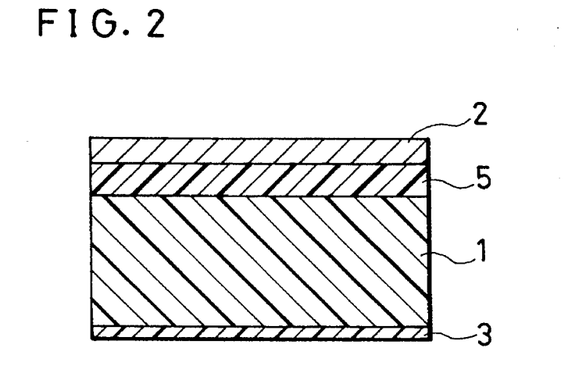
FIG. 2 is a cross-sectional view of a video tape of the Example 2 of the present invention.

FIG. 2 is a cross-sectional view of a video tape of this Example 2 of the present invention. In FIG. 2, numerals 1, 2, 3 and 5 designate a non-magnetic substrate, a magnetic film, a back-coat film and an under-coat film, respectively.

Video tape samples of example 2 were made by the following procedure;

(a) The coating material (A-1) for an under-coat film was applied on a 6-μm thick PET film of the non-magnetic substrate 1 and dried;

(b) The dried coating material (A-1) was mirror-finished by means of a calendar and then heat-treated to form a 3-μm thick under-coat film 5;

(c) The coating material (M) for the magnetic film was applied on the under-coat film 5, and the applied coating material (M) was subjected to a magnetic field orientation treatment, and then dried;

(d) The dried coating material (M) was mirror-finished by means of a calendar and then heat-treated to give a stock roll of PET film having a 2.5-μm thick magnetic film 2 on one side;

(e) The coating material (B) for the back-coat film was applied on the side opposite to the magnetic film 2, of the PET film 1, dried, and heat-treated to form a 0.5-μm thick back-coat film 3, and;

(f) The coated film was split to give ½ inch video tape samples (250 m long).

[Example 3]

Figure 3:
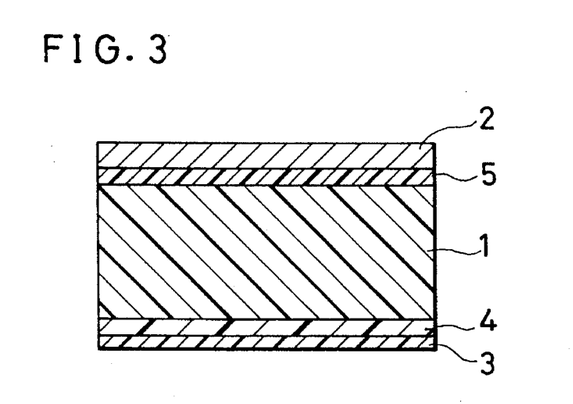
FIG. 3 is a cross-sectional view of a video tape of the Example 3 of the present invention.

FIG. 3 is a cross-sectional view of a video tape of this Example 3 of the present invention. In FIG. 3, numerals 1, 2, 3, 4 and 5 designate a non-magnetic substrate, a magnetic film, a back-coat film and a first and a second under-coat films, respectively.

Video tape samples of example 3 were made by the following procedure:

(a) The coating material (A-1) for a first and a second back-coat film was respectively applied on both surfaces of a 6-μm thick PET film of the non-magnetic substrate 1;

(b) The respective dried coatings material (A-1) were mirror-finished by means of a calendar and then heat-treated to give a stock roll of PET film having respective the first and the second 1.5-μm thick under-coat films 4, 5 on both sides thereof;

(c) The coating material (M) for the magnetic film was applied on the first under-coat film 5, and the applied coating material (M) was subjected to a magnetic field orientation treatment, and then dried;

(d) The dried coating material (M) was mirror-finished by means of a calendar and then heat-treated to form a 2.5-μm thick magnetic film 2;

(e) The coating material (B) for the back-coat film was applied on the second under-coat film 4, dried, and heat-treated to form a 0.5-μm thick back-coat film 3, and (f) The coated film was split to give ½ inch video tape samples (250 m long).

[Example 4]

Video tape samples of this Example 4 were made by the same procedure of the Example 1 except that another coating material herein referred as (A-2) to make another under-coat film is used instead of the coating material (A-1). And the coating material (A-2) differs from the coating material (A-1) only in that flake powder of $\alpha$-$Fe_2O_3$ therein has the aspect ratio R=30 and the average diameter=0.3-μm.

[Example 5]

Video tape samples of this Example 5 were made by the same procedure of the Example 1 except that a third coating material herein referred as (A-3) to make a third under-coat film is used instead of the coating material (A-1). And the coating material (A-3) differs from the coating material (A-1) only in that flake powder of $\alpha$-$Fe_2O_3$ therein has the aspect ratio R=90 and the average diameter=1.0 μm.

[Example 6]

Video tape samples of this Example 6 were made by the same procedure of the Example 1 except that a fourth coating material herein referred as (A-4) to make a fourth under-coat film is used instead of the coating material (A-1). And the coating material (A-4) differs from the coating material (A-1) only in that flake powder of $\alpha$-$Fe_2O_3$ therein has the aspect ratio R=120 and the average diameter=2.5 μm.

[Example 7]

Video tape samples of this Example 7 were made by the same procedure of the Example 1 except that a fifth coating material herein referred as (A-5) to make a fifth under-coat film is used instead of the coating material (A-1).

(9-1) The coating material (A-5) for the under-coat film is prepared as follows:

(a) Milling and dispersion of the following materials is made in a press kneader and further in a sand mill to make a composition;

| | |
|---|---|
| Flake powder of $\alpha$-$Fe_2O_3$ (which corresponds flake powder of non-magnetic inorganic material) | 100 parts |
| Aspect ratio R = 60 | |
| Average diameter = 0.6 μm | |
| Polyurethane resin* | 8.5 parts |
| Vinyl chloride copolymer resin* | 8.5 parts |
| Organic solvent mixture (MEK:toluene:cyclohexanone = 3:2:1) | 200 parts |

(b) Admixing of 9 parts of a polyisocyanate compound* ("Coronate-L", supplied by Nippon Polyurethane Industry Co., Ltd.) with the composition is made to make an admixture, and;

(c) Filtrating the admixture through a filter of 2-μm mean pore size to make up the intended coating material (A-5) for the under-coat film use.

(* These substances correspond with the binder.)

[Example 8]

Video tape samples of this Example 8 were made by the same procedure of the example 1 except that a sixth coating material herein referred as (A-6) to make a sixth under-coat film is used instead of the coating material (A-1).

(10-1) The coating material (A-6) for the under-coat film is prepared as follows:

(a) Milling and dispersion of the following materials is made in a press kneader and further in a sand mill to make a composition;

| | |
|---|---|
| Flake powder of $\alpha$-$Fe_2O_3$ (which corresponds flake powder of non-magnetic inorganic material) | 100 parts |
| Aspect ratio R = 60 | |
| Average diameter = 0.6 μm | |
| Polyurethane resin* | 38 parts |
| Vinyl chloride copolymer resin* | 38 parts |
| Organic solvent mixture (MEK:toluene:cyclohexanone = 3:2:1) | 300 parts |

(b) Admixing of 9 parts of a polyisocyanate compound* ("Coronate-L") with the composition is made to make an admixture, and;

(c) Filtrating the admixture through a filter of 2-μm mean pore size to make up the intended coating material (A-6) for the under-coat film use.

(* These substances correspond with the binder.)

[Comparison Example 1]

Video tape samples of this Comparison example 1 were made by the following procedure:

(a) The coating material (M) for the magnetic film was applied on a 9-μm thick PET film and the applied coating material (M) was subjected to a magnetic field orientation treatment and then dried;

(b) The dried coating material (M) was mirror-finished by means of a calendar and then heat-treated to give a stock roll of PET film having a 2.5-μm thick magnetic film on one side;

(c) The coating material (B) for the back-coat film was applied on the side opposite to the magnetic film of the PET film, dried, and heat-treated to form a 0.5-μm thick back-coat film, and;

(d) The coated film was split to give ½ inch video tape samples (250 m long).

That is, in the comparison example 1, the PET film therein has the thickness (9-μm) including both the thickness of the PET film (6-μm) and the under-coat film (3-μm) of the example 1.

[Comparison Example 2]

Video tape samples of this Comparison example 2 were made by the same procedure of the Comparison example 1 except that a PEN film is used instead of the PET film.

[Comparison Examples 3, 4 and 5]

Video tape samples of these Comparison examples 3, 4 and 5 were made by the same procedure of the Examples 1, 2 and 3, respectively, except that a seventh coating material herein referred as (a-1) to make a seventh undercoat film is used instead of the coating material (A-1). And the coating material (a-1) differs from the coating material (A-1) only in that the powder of $\alpha$-$Fe_2O_3$ therein is granular one (having average particle size=0.2 μm).

[Comparison Examples 6, 7 and 8]

Video tape samples of these Comparison examples 6, 7 and 8 were made by the same procedure of the Examples 1, 2 and 3 respectively, except that a eighth coating material herein referred as (a-2) to make an eighth undercoat film is used instead of the coating material (A-1). And the coating material (a-2) differs from the coating material (A-1) only in that the flake powder of $\alpha$-$Fe_2O_3$ therein is needle-shaped one (major axis length (which means a maximum diameter)=0.3 μm, minor axis length (which means a minimum diameter)=0.03 μm). That is, in these comparison examples 6, 7 and 8 the maximum diameter of the particle of the flake powder is considerably longer than the minimum diameter thereof.

The following evaluation tests were made on different video tape samples obtained in the foregoing examples and comparison examples.

(1) [Smoothness of the Under-coat Film]

Smoothness of the under-coat film were relatively indicated by a gloss which was measured by a gloss meter (manufactured by NIPPON DENSHOKU KOGYO Inc. JAPAN) on condition that both the incident angle and reflection angle are 60°.

Especially, this evaluation test were made on tape samples before forming a back-coat film and/or a magnetic film.

(2) [Young's Modulus of the Under-coat Film (kg/mm²)]

Young's modulus of the under-coat film is defined by the following equation (1):

$$\text{Young's modulus of the under-coat film} = \frac{(dA + dB)ET - dB \times EB}{dA}, \quad (1)$$

wherein
dA(mm): thickness of the under-coat film,
dB(mm): thickness of the non-magnetic substrate,
ET(Kg/mm²): Young's modulus of the non-magnetic substrate having the under-coat film thereon, and
EB(Kg/mm²): Young's modulus of the non-magnetic substrate.

2,1 As to measuring of ET: A stock roll of PET or PEN film having only the under-coat film thereon obtained in each example and comparison example was slit to give a tape sample (2-inch length and 0.5inch width) for this evaluation test. And Young's modulus of a tape sample was measured by a tensile tester (manufactured by ORIENTIC Inc. JAPAN).

2,2 As to measuring of EB:

Young's modulus of PET or PEN film was measured in the same way as the measuring of ET.

And further, both Young's modulus of lengthwise direction of the under-coat film and widthwise direction of the under-coat film were obtained. The Young's modulus of widthwise direction was measured through a tape sample which was obtained by slitting the coated film in widthwlse direction thereof.

(3) [Stiffness of a Tape (mg)]

Both values of stiffness of lengthwise direction of a video tape and that of widthwise direction thereof were measured by a stiffness tester (manufactured by TOYOSEIKI Inc. JAPAN). And the stiffness of widthwise direction was measured through a tape sample which was obtained by slitting the film in widthwise direction thereof.

(4) [RF Output at 7 MHz (dB)]

An RF output (at 7 MHz) of each sample video tape was measured by using a S-VHS system VTR. The measured RF output were expressed in terms of the values relative to that of a standard tape for the S-VHS system (having about 19-μm thickness).

(5) [Running Durability]

After repeating 100 times of running (in a play-back state) of each video tape examples under the condition of 40° C.—80% relative humidity (RH) the shape of the tape was observed.

The result of the observation was defined as follows;
(i) Good:

No undulant-shaped side edge of a tape is observed and, no fold of side edge of a tape is observed.
(ii) Fair:

Only a tendency of undulant-shaped side edge of tape is observed, and/or only tendency of fold of side edge of a tape is observed, but there is no problem for practical use.
(111) Poor:

Numerous folds of side edge of a tape are observed.
(iv) Very poor:

Numerous parts of undulant-shaped side edge of a tape are observed and numerous folds of side edge of a tape are observed.

Table 1 shows results of these evaluation tests as to respective sample tapes.

TABLE 1

| | (1) Gloss of under coat film | (2) Young's Modulus of under coat film [kg/mm²] | | (3) Stiffness of a tape [mg] | | (4) RF output at 7 MHz [dB] | (5) Running durability |
|---|---|---|---|---|---|---|---|
| | | Lengthwise direction | Widthwise direction | Lengthwise direction | Widthwise direction | | |
| Example 1 | 135 | 2280 | 2310 | 149 | 114 | +0.2 | Good |
| Example 2 | 136 | 2320 | 2290 | 110 | 107 | 0.0 | Fair |
| Example 3 | 138 | 2290 | 2320 | 146 | 122 | +0.1 | Good |
| Example 4 | 157 | 1830 | 1810 | 135 | 105 | +0.5 | Fair |
| Example 5 | 127 | 2720 | 2680 | 157 | 120 | +0.2 | Good |
| Example 6 | 123 | 2500 | 2490 | 153 | 117 | 0.0 | Good |
| Example 7 | 121 | 2530 | 2550 | 154 | 117 | −0.1 | Good |
| Example 8 | 151 | 1930 | 1910 | 138 | 107 | +0.3 | Fair |
| Comparison example 1 | — | — | — | 81 | 76 | −0.7 | Very poor |
| Comparison example 2 | — | — | — | 90 | 83 | −0.5 | Poor |
| Comparison example 3 | 137 | 760 | 750 | 96 | 78 | −0.4 | Very poor |
| Comparison example 4 | 135 | 740 | 760 | 92 | 76 | −0.6 | Very poor |
| Comparison example 5 | 134 | 760 | 740 | 91 | 74 | −0.5 | Very poor |
| Comparison example 6 | 132 | 1430 | 720 | 114 | 65 | −0.6 | Poor |
| Comparison example 7 | 132 | 1410 | 710 | 90 | 66 | −0.9 | Very poor |
| Comparison example 8 | 134 | 1430 | 700 | 106 | 66 | −0.8 | Poor |

Figure 4:
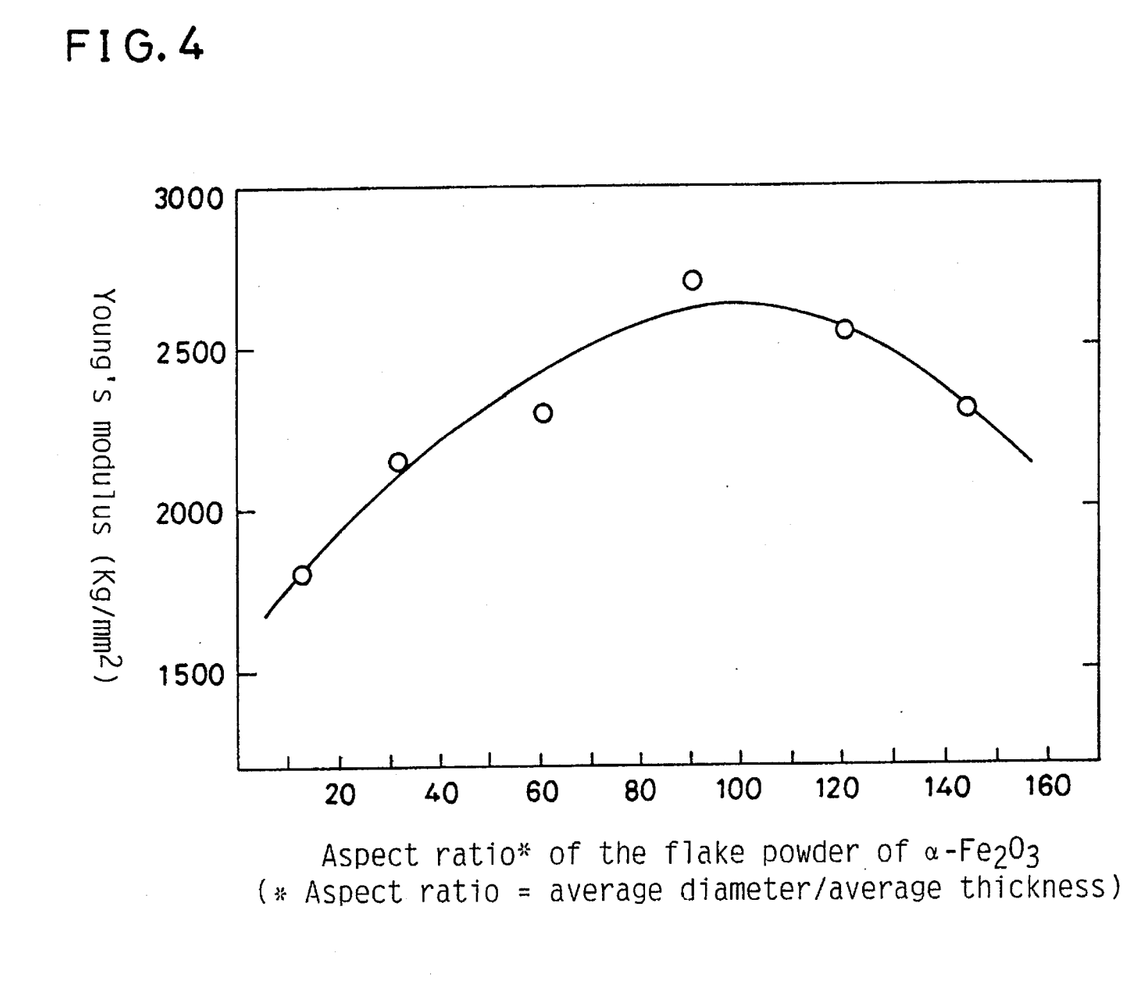
FIG. 4 is a graph showing the relation between the aspect ratio R of the flake powder of $\alpha\text{-Fe}_2O_3$ (having the average diameter=0.6 μm) in the under-coat film of the example 1 and the Young's modulus.

FIG. 4 is a graph showing the relation between the aspect ratio R of the flake powder of $\alpha\text{-Fe}_2\text{O}_3$ (having the average diameter=0.6 μm) in the under-coat film of the example 1 and the Young's modulus.

Figure 5:
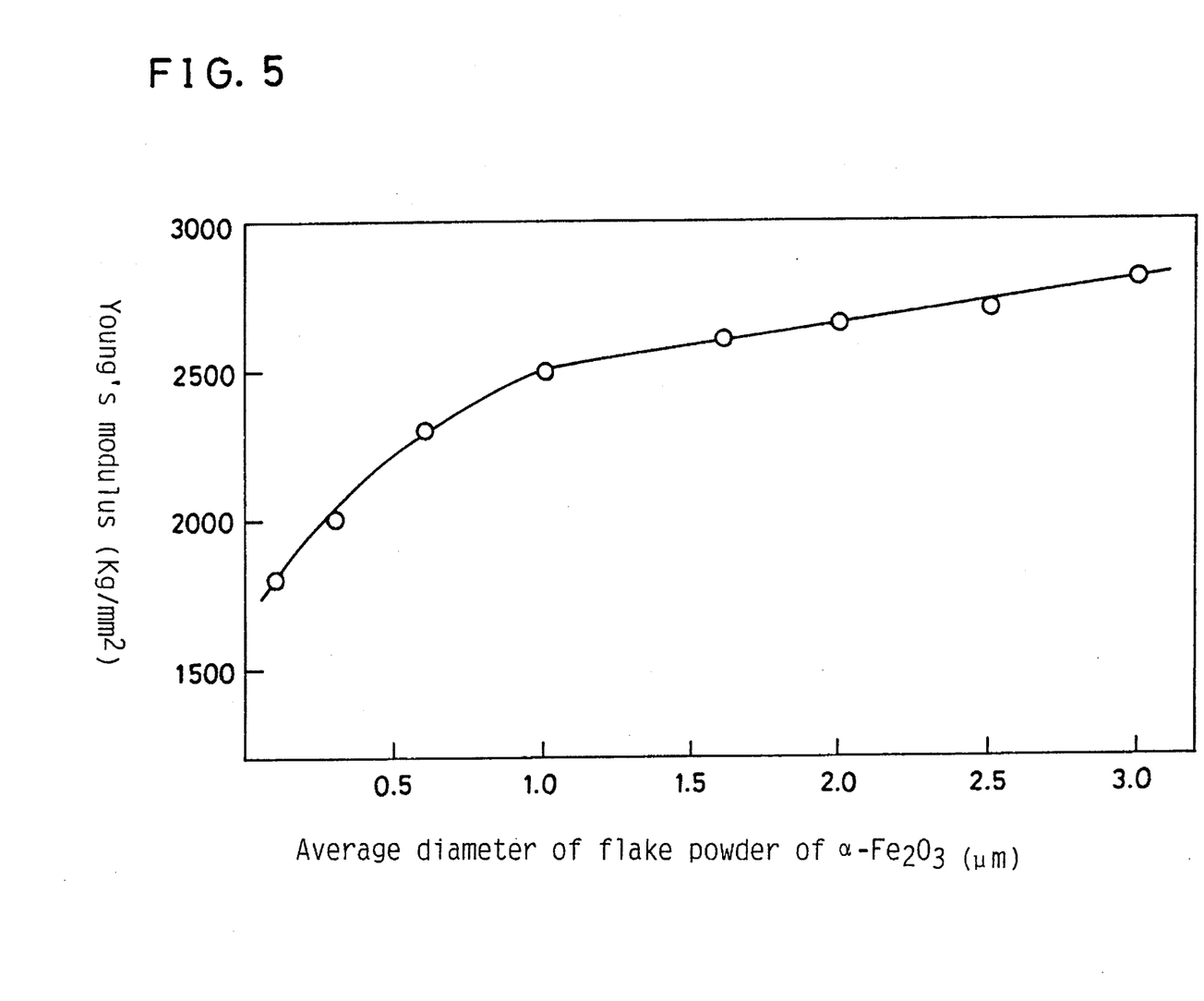
FIG. 5 is a graph showing the relation between the average diameter of the flake powder of $\alpha\text{-Fe}_2O_3$ having the aspect ratio R=60) in the under-coat film of the example 1 and Young's modulus of the same.

FIG. 5 is a graph showing the relation between the average diameter of the flake powder of $\alpha\text{-Fe}_2\text{O}_3$ (having the aspect ratio R=60) in the under-coat film of the example 1 and Young's modulus of the same.

Figure 6:
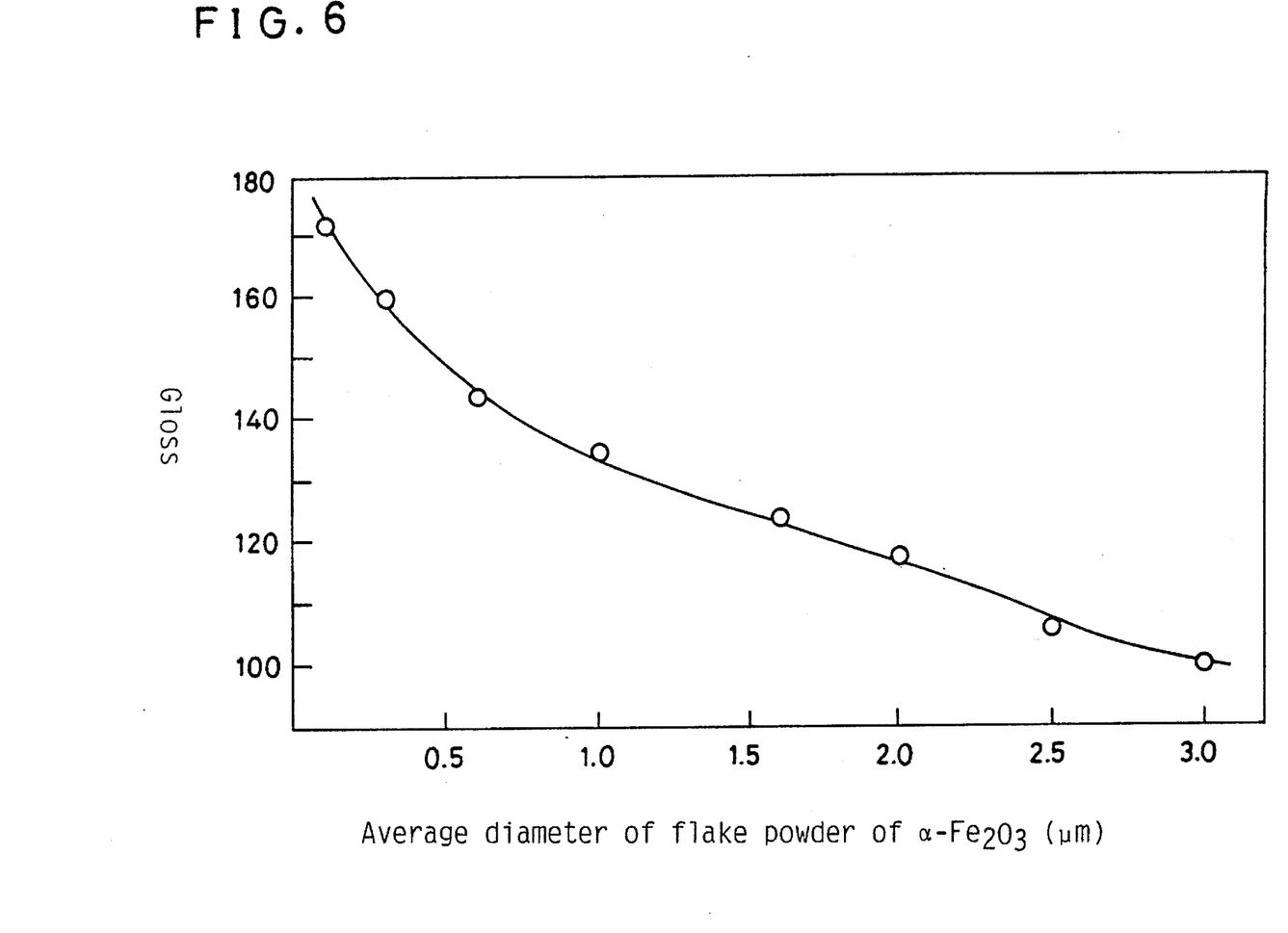
FIG. 6 is a graph showing the relation between the average diameter of the flake powder of $\alpha\text{-Fe}_2O_3$ (having the aspect ratio R=60) in the under-coat film of the Example 1 and the gloss of the same.

FIG. 6 is a graph showing the relation between the average diameter of the flake powder of $\alpha\text{-Fe}_2\text{O}_3$ (having the aspect ratio R=60) in the under-coat film of the Example 1 and the gloss of the same.

Figure 7:
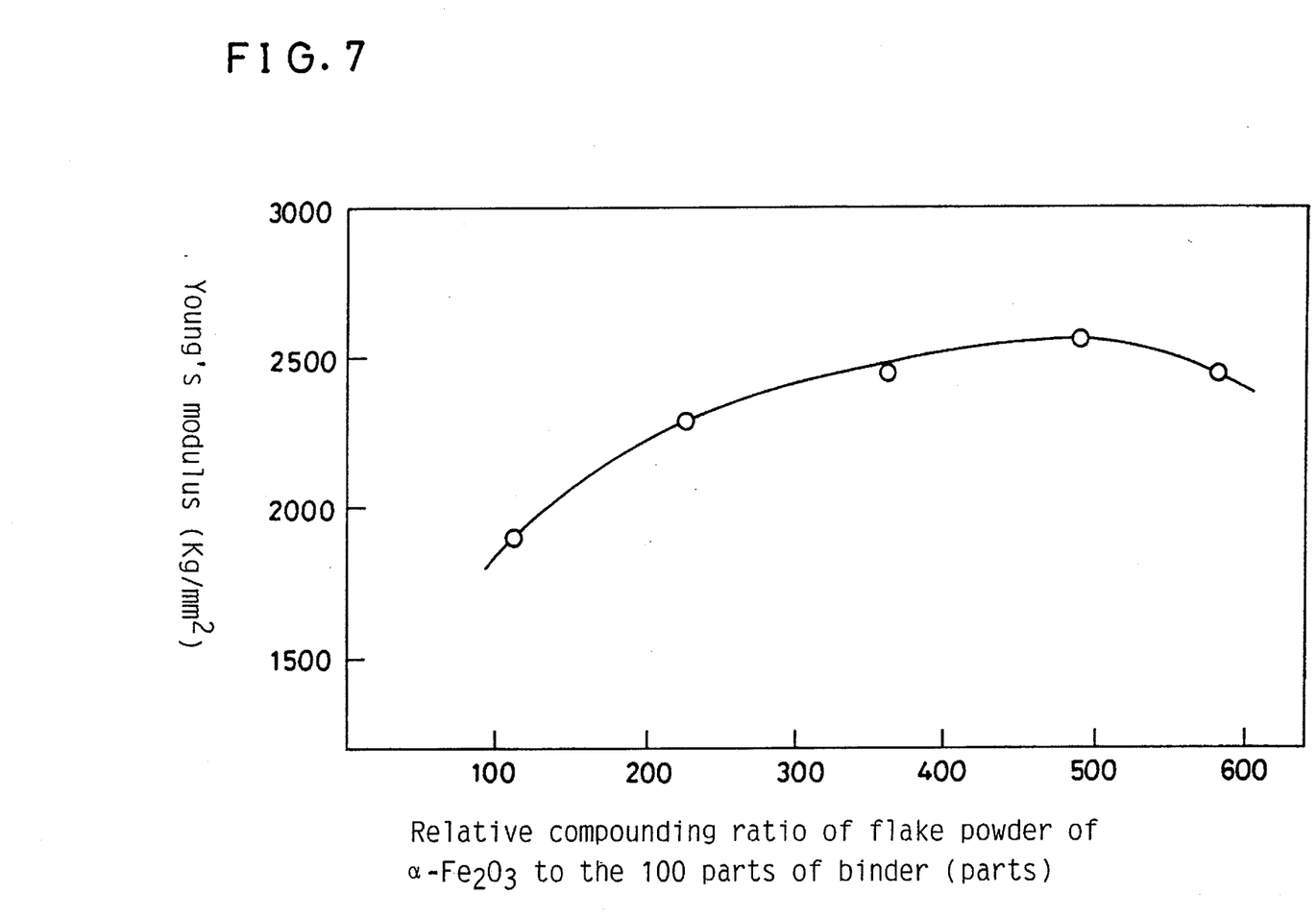
FIG. 7 is a graph showing the relation between a relative compounding ratio of parts of the flake powder of $\alpha\text{-Fe}_2O_3$ (having the aspect ratio R=60 and the average diameter=0.6 μm) to the 100 parts of binder in the under-coat film of the Example 1 and Young's modulus of the same under-coat film.

FIG. 7 is a graph showing the relation between a relative compounding ratio of parts of the flake powder of $\alpha\text{-Fe}_2\text{O}_3$ (having the aspect ratio R=60 and the average diameter=0.6 μm) to the 100 parts of binder in the under-coat film of the Example 1 and Young's modulus of the same under-coat film.

Figure 8:
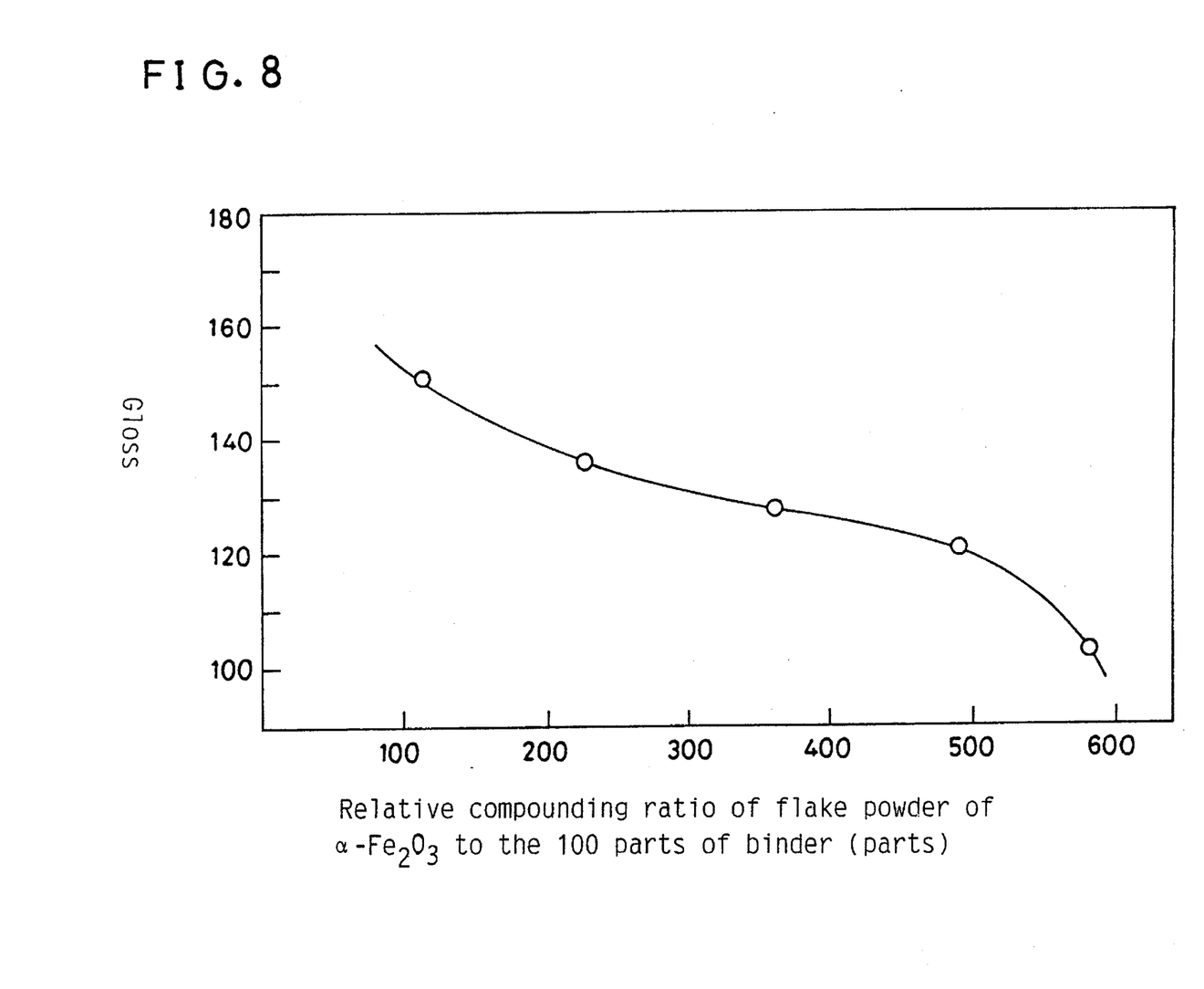
FIG. 8 is a graph showing the relation between a relative compounding ratio of parts of the flake powder of $\alpha\text{-Fe}_2O_3$ (having the aspect ratio R=60 and the average diameter=0.6 μm) to the 100 parts of binder in the under-coat film of the Example 1 and gloss thereof.

FIG. 8 is a graph showing the relation between a relative compounding ratio of parts of the flake powder of $\alpha\text{-Fe}_2\text{O}_3$ (having the aspect ratio R=60 and the average diameter=0.6 μm) to the 100 parts of binder in the under-coat film of the Example 1 and gloss of the same.

From the above-mentioned result, it is shown that the magnetic recording tape of the present invention has splendid property of electromagnetic traducing characteristics and high (running) durability in spite of thinning the total thickness thereof.

The afore-mentioned embodiment is elucidated with respect to only the examples which use the flake powder of $\alpha\text{-Fe}_2\text{O}_3$. With respect to other examples which use flake powdered graphite, boron nitride, kaoline, mica, ZnO or SiC, similar effects as mentioned above were observed.

The above-mentioned embodiment is elucidated with respect to only the examples which are used as video tapes for the S-VHS system VTR, but it goes without saying that the magnetic recording medium of the present invention is applicable to a video tape for an 8 mn VTR or the like, a magnetic tape for audio, a magnetic tape for computer, or a disk-shaped magnetic recording medium such as a floppy disk.

From the data shown in Table 1 and FIGS. 4, 5, 6, 7 and 8 and other experiments the following conclusion was obtained:

The following conclusion was obtained especially from FIG. 4, 7 and 8. In order to reduce anisotropy of the elastic modulus in the plannary direction of the under-coat film and In order to obtain the under-coat film having high elastic modulus, flake (plate-shaped) powder of non-magnetic inorganic material should be mixed with binder(s) to form the under-coat film. And it is preferable to raise an aspect ratio R (which is defined below) of the flake powder and a packing density thereof in the under-coat film, in order to obtain a good effect of the flake powder.

The planar of the flake powder is not limited to a particular shape, but preferable shape is a circle shape, a triangular shape, a quadrangular shape, a hexagonal shape a polygonal shape or the like. In these shapes, a maximum diameter of the particle is not considerably longer than a minimum diameter of the same, so that packing of these particles is made easy and it results in little anisotropy of the elastic modulus in the plane. That is, these shapes are more preferable than a long needle shape or a long rod shape.

The aspect ratio R Is defined as a ratio of an average diameter of the particle of the flake powder to an average thickness thereof (an average diameter/an average thickness). An average diameter is the averaged value of the maximum diameter and the minimum diameter in the plane of particles of the flake powder. The measurement of the average diameter and the average thickness can be made by a transmission type electron microscope or a scanning type one.

The following conclusion was obtained especially from FIG. 4. Effective range of the aspect ratio R of the flake powder in the non magnetic inorganic material is from 5 to 150, preferably from 20 to 120.

In case the aspect ratio R of the flake powder is less than 5, it is difficult to obtain sufficient value of the elastic modulus of the under-coat film. Thereby, it becomes difficult to raise the elastic modulus (the stiffness) of the tape sufficiently. In contrast, in case the aspect ratio R of the flake powder is more than 150, sufficient raising of the elastic modulus is not possible, since undesirable breaking of the particles of the flake powder is likely to occur on the occasion of dispersion of the flake powder in the binder.

The following conclusion was obtained especially from FIGS. 5 and 6. As a preferable condition to be provided with flake powder, an effective range of the average diameter of the particles of the flake powder is from 0.05 μm to 3 μm, and more preferably from 0.1 μm to 2.5 μm, so it is necessary to use the particles having very thin average thickness which is suitable for the above-mentioned effective range of the aspect ratio R. Owing to the thin thickness, the undesirable breaking of the particles of the flake powder is apt to occur on the occasion of dispersion of the flake powder in the binder. Thereby, it is not realized to raise the elastic modulus sufficiently. In contrast, in case the average diameter of particles of the flake powder is more than 3 μm, it is difficult to keep a sufficient smoothness of the under-coat film for enabling smoothness property to the other films (i.e. the magnetic film and/or the back-film).

Any powdered non-magnetic inorganic material having the shape of particles which satisfy the above-mentioned all effective ranges (of i.e. the average diameter and the aspect ratio R) can be used as the flake powder, whether the material is natural one or is synthetic one.

Examples of the natural materials (for the flake powder of non-magnetic material), are kaoline, mica, boron nitride, graphite etc. and examples of the synthetic one are $\alpha$-$Fe_2O_3$, $Cr_2O_3$, ZnO, SiC, $Al_2O_3$, $MgCO_3$, $BaSO_4$ etc.

Most preferable materials for the flake powder of non-magnetic inorganic material are $\alpha$-$Fe_2O_3$, graphite, boron nitride, kaloline, mica, ZnO and SiC. These materials may be used alone or in combination.

The above-mentioned composed materials for the flake powder can be produced by a known method. For example, the flake powder of $\alpha$-$Fe_2O_3$ is produced by gradual decomposition of triethanolamine iron (III) complex through a hydrothermal reaction. It (the flake powder of $\alpha$-$Fe_2O_3$) is also produced by a hydrothermal treatment of amorphous iron (II) hydroxide (which is produced by a reaction of concentrated aqueous solution of iron sulfate with aqueous solution of sodium hydroxide) in alkaline aqueous solution. And further, it may be preferable to add an agent for controlling crystal growth, which agent is composed, for instance, of d-tartaric acid, l-tartaric acid and/or derivative therefrom in the above-mentioned hydrothermal treatment.

The following conclusion was obtained especially from FIGS. 7 and 8. As a preferable condition to be provided with the flake powder, an effective relative compounding ratio of the flake powder of non-magnetic material to the binder in the under-coat film is from 100 parts to 600 parts per 100 parts (in weight) of the binder. In case the relative compounding ratio is less than 100 parts, it is difficult to obtain a sufficiently high elastic modulus of the under-coat film. In contrast, in case the relative compounding ratio is more than 600 parts, the smoothness of the under-coat film is lowered, and further, the reduced packing density of the flake powder is likely to lead reduced elastic modulus of the under-coat film thereby to weaken the under-coat film.

The binder(s) used in the under-coat film of the present invention can be chosen from the following wide variety of known binders such as, combination of isocyanate compounds with thermoplastic resins, for instance cellulosic resins, polyurethane resins, polyvinyl chloride resins, polyester resins, acrylic resins, and rubberous resins and also, combinations of the thermoplastic resins with resins or compounds having radiation-responsive unsaturated double bonds.

Further it is possible to add a fatty acid and/or a fatty acid ester as a dispersant or a lubricant in addition to the combination.

It is possible to smooth the surface of the under-coat film by a calendar in order to adjust the smoothness of the surface thereof and to raise the elastic modulus of the same.

Either a usual coated magnetic film or a usual metal thin film type magnetic film is usable for the magnetic film of the present invention.

An oxide magnetic material, a magnetic metal or a magnetic alloy is usable as a magnetic material to form the magnetic film. Examples of such oxide magnetic materials are $\gamma$-$Fe_2O_3$, $\gamma$-$Fe_2O_3$ containing Co, $Fe_3O_4$ including Co, $CrO_2$, barium ferrit etc. Examples of such magnetic metal and alloy are Fe, Fe-Ni, Fe-Co etc.

The back-coat film used in the magnetic recording medium of the present invention is formed as follows:

a coating material (composed of powder of non-magnetic material, binder(s), solvent(s) and dispersant(s) and/or lubricant(s) which are added as required) for the back-coat film is applied on the side, which is opposite to the side coated by the magnetic film, of the non-magnetic substrate;

the applied back-coat film is dried, and;

a smoothing treatment of the surface of the back-coat film and/or a heat treatment thereof is made as required.

The binder used in the magnetic film of the (coated type) magnetic recording medium and in the back-coat film of the present invention can be chosen from the following wide variety of known binders: combinations of isocyanate compounds with thermoplastic resins such as cellulosic resins, polyurethane resins, polyvinyl chloride resins, polyester resins, acrylic resins, and rubberous resins; and combinations of said thermoplastic resins with resins or compounds having radiation-responsive unsaturated double bonds.

Since powder of carbon black has the advantage of improvement for good conductivity and good shielding from light as well as running durability, the powder of carbon black is most preferable as the non-magnetic powder included in the back-coat film of the magnetic recording medium of the present invention. Besides the carbon black, zinc oxide, calcium carbonate and magnesium sulfate are usable as the non-magnetic powder and these materials may be used alone or in combination with the powder of carbon black.

Further, in order to improve the abrasion (wear) resistance of the back-coat film, powdered alumina, chromium dioxide, titanium oxide or the like having high hardness can be added to the magnetic powder as required.

In the present invention, order of forming each films (e.g. the order of forming the magnetic film 2 and forming the under-coat film 4 in the example 1) has no relation with the effect of the present invention. And, even if simultaneous forming of each films is made (e.g. the magnetic film 2 and the under-coat film 5 were formed simultaneously in the example 2), same effect as aforementioned is obtained.

Suitable materials for the non-magnetic substrate used in the magnetic recording medium of the present invention is as follows: polyesters such as PET and PEN; polyolefins such as polyethylene and polypropylene; cellulose derivatives such as cellulose triacetate and cellulose diacetate; other organic compounds such as polycarbonate, polyvinyl chloride, polyimide, aromatic polyamide and or the like. Among these materials, the polyesters are most preferable, by synthesizing the whole characteristics thereof such as high durability, high stiffness (strength) and inexpensive cost.

Various kind of mixers may be used for milling and dispersing the coating materials for such as the under-coat film, the coated magnetic film and the back-coat film. Examples of such mixers are a roll mill, a kneader, an attriter, a double planetary mixer, a high-speed stone mill, an agitator mill, a sand mill, a pin mill, a ball mill, a pebble mill, a high-speed stirrer, and an ultrasonic dispersion equipment, which are usable alone or in combination.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A magnetic recording medium comprising:

a non-magnetic substrate;

a magnetic film formed on one surface of said non-magnetic substrate;

a back-coat film formed on a second surface of said non-magnetic substrate; and an under-coat film formed at least one of between said non-magnetic substrate and said magnetic film and between said non-magnetic substrate and said back-coat film, said under-coat film having flake powder of non-magnetic inorganic material and a binder, said flake powder having a thin-plate shape defined by an aspect ratio R ranging from 5 to 150, said aspect ratio R being a ratio of an average diameter of said flake powder to an average thickness of said flake powder, a relative compounding ratio of said flake powder to said binder being selected within a range from 100 parts to 600 parts per 100 parts of weight of said binder.

2. A magnetic recording medium in accordance with claim 1, wherein said flake powder of non-magnetic inorganic material has an average diameter in a range from 0.05 μm to 3 μm, said average diameter being an averaged value of the maximum diameter and the minimum diameter of particles of said flake powder.

3. A magnetic recording medium in accordance with claim 1, wherein said flake powder of non-magnetic inorganic material is $\alpha$-$Fe_2O_3$.

4. A magnetic recording medium in accordance with claim 1, wherein said flake powder of non-magnetic inorganic material is graphite.

5. A magnetic recording medium in accordance with claim 1, wherein said flake powder of non-magnetic inorganic material is boron nitride.

6. A magnetic recording medium in accordance with claim 1, wherein said flake powder of non-magnetic inorganic material is kaoline.

7. A magnetic recording medium in accordance with claim 1, wherein said flake powder of non-magnetic inorganic material is mica.

8. A magnetic recording medium in accordance with claim 1, wherein said flake powder of non-magnetic inorganic material is znO.

9. A magnetic recording medium in accordance with claim 1, wherein said flake powder of non-magnetic inorganic material is SiC.

* * * * *